No. 880,202. PATENTED FEB. 25, 1908.
A. H. DINGMAN.
AUTOMOBILE.
APPLICATION FILED JUNE 13, 1907.
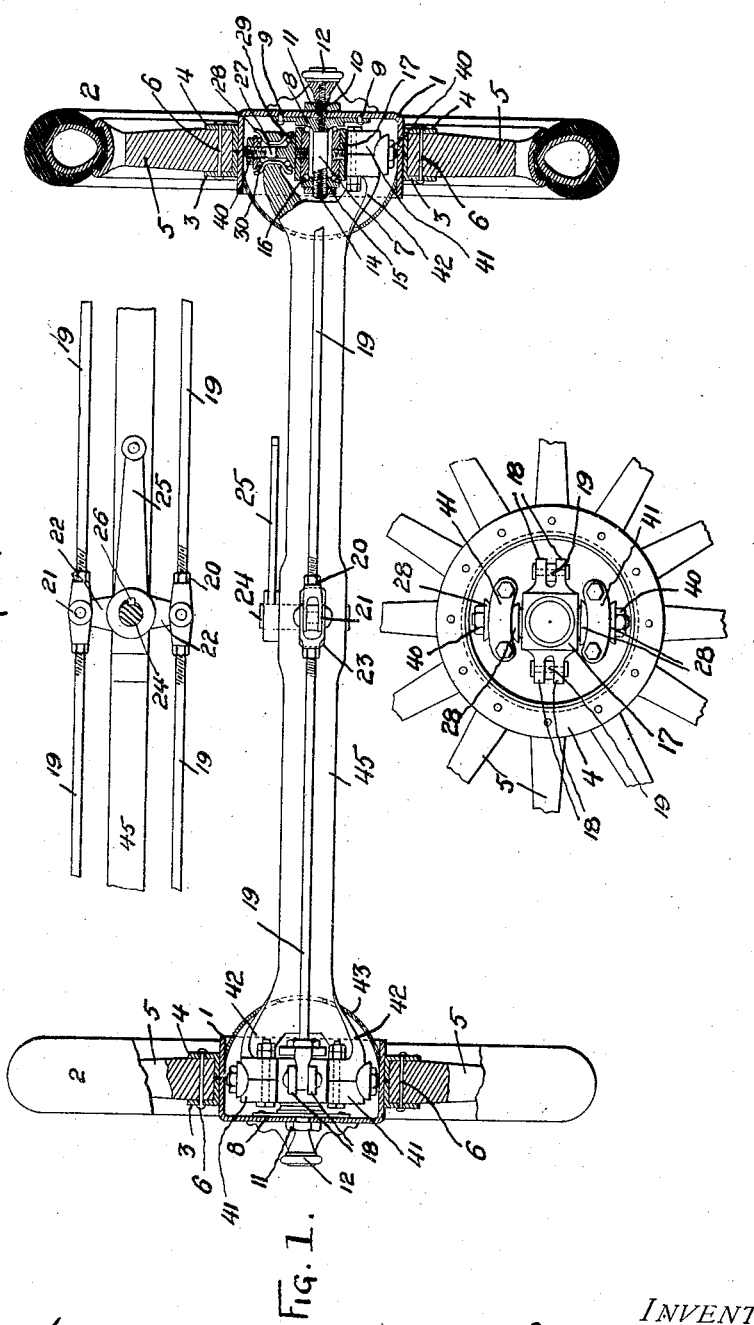
WITNESSES:
C. N. Woodward.
D. H. Butler.
INVENTOR
A. H. Dingman,
BY H. C. Everitt & Co.
Attorneys

UNITED STATES PATENT OFFICE.

ALLEN H. DINGMAN, OF DE HAVEN, PENNSYLVANIA, ASSIGNOR OF ONE-HALF TO JOHN SAUERS, OF DE HAVEN, PENNSYLVANIA.

AUTOMOBILE.

No. 880,202.  Specification of Letters Patent.  Patented Feb. 25, 1908.

Application filed June 13, 1907. Serial No. 378,842.

*To all whom it may concern:*

Be it known that I, ALLEN H. DINGMAN, citizen of the United States of America, residing at De Haven, in the county of Allegheny and State of Pennsylvania, have invented certain new and useful Improvements in Automobiles, of which the following is a specification, reference being had therein to the accompanying drawing.

This invention relates to automobiles and similar motor driven vehicles, and the invention relates more particularly to a novel steering or guiding device.

The invention has for its object to provide a steering device that will greatly facilitate the guiding of a vehicle with the least possible exertion by the operator or driver, this being accomplished by a novel construction insuring perfect control of the forward or steering wheels of a vehicle.

My invention aims to dispense with the ordinary pivoted crank connection of the forward wheels of a vehicle, and to provide the wheels with novel hub bearings, thus insuring less breakage and greater safety. To this end, the hubs which I employ in connection with vehicle wheels are of a ball bearing construction and are arranged whereby they can be perfectly controlled, the controlling mechanism being in two coöperating sets, and located upon the axle of a vehicle in such a position that should one set break, the other set can be easily used.

The detailed construction entering into my invention will be presently described and then specifically pointed out in the appended claims.

Referring to the drawing forming a part of this specification, Figure 1 is a view of the two forward steering wheels of an automobile, illustrating one of said wheels in section and the other of said wheels partly in elevation. Fig. 2 is a plan of the connecting axle of said wheels, and Fig. 3 is an elevation of a portion of one of the wheels.

To put my invention into practice, I construct the hub 1 of each of the wheels 2 in the form of a metallic housing having its outer end closed, while its inner end is open to receive the bifurcated ends of the vehicle axle 45. Upon each metallic housing 1 are secured two metallic rings 3 and 4, each ring being L shaped in cross section, and when placed together provide an annular groove in which are fixed the spokes 5 of the wheels by nuts and bolts 6.

Secured to the inner face of the housing 1 is a spindle 7, said spindle having a circular head 8 abutting against the inner face of the housing 1. The head 8 is held in engagement with the housing by dowel pins 9 carried by the inner face of the housing 1 and engaging apertures provided therefor in the head 8 and by a screw bolt 10, the latter passing through the housing 1 into the spindle end, being provided with a jam nut 11 and with an ornamental cap 12. The inner end of the spindle 7 is threaded, as at 14, to receive nuts 15, the innermost nut, together with the head 8, being formed with races for anti-friction balls 16, said balls being held in their annular races by a swivel joint support 17 having diametrically opposed apertured lugs 18 for receiving the apertured ends of connecting rods 19. The connecting rods 19 are screwed into clevises 20 pivotally mounted, as at 21, upon the ends of a lever 22, said lever being located within a transverse slot 23 formed in the axle 45. The lever 22 is fixed upon a vertically disposed pin 24 arranged in the axle 45, an actuating lever 25 being keyed to the pin 24, as at 26.

The swivel joint support 17 is provided with two vertically alining bearing pins 27, surrounded by bearing sleeves 28. Interposed between the pins 27 in sleeves 28 are anti-friction balls 29 and 30, the latter being held by nuts 40 mounted upon the ends of the pins 27. Secured to the sleeves 28 by clamps 41 are the arms 42 of the ends of the axle 45.

It will be observed from the novel construction of the wheel that by removing the cap 12, nut 11 and screw bolt 10, the housing 1 and its appurtenant parts can be easily and quickly detached from the end of the axle, thereby permitting inspection of the bearings and such repairs as may be necessary.

In operation the wheels revolve on the horizontal or main anti-friction balls 16, and are moved laterally on the anti-friction balls 30, to produce a change in the course of the vehicle. This lateral movement of the wheels is produced at will, by the operator or driver, and is conveyed to the swivel supports 17 by virtue of the connecting rods 19, pin 24 and lever 25. The lever 25 can be connected to a regular steering wheel gear or to a common vertical hand lever, (not shown) located near the seat in convenient reach of the operator of the vehicle.

To protect the bearings within the housing 1 from dust, stones and foreign matter, I employ semi-spherical hoods 43 fitting over the bifurcated ends of the axle 45 and suitably secured to said axle, these hoods permitting free lateral movement of the wheels without exposing the bearings.

By the novel construction of the bearings, especially in positioning the vertical bearings within the center of the wheel and directly in alinement with the center of tread, it will be observed that it will require the least possible lateral movement to accomplish any given results, and correspondingly accomplish the same with the least possible effort. It will also be noted that the location of the vertical bearings (commonly known as steering knuckles) within the center of the wheel, almost wholly, if not entirely, relieves the strain, shock and other stresses, which are ordinarily experienced in steering devices. It is also apparent that in using two sets of connecting rods that should either set become loose, broken or detached, the other set would provide full and complete control of the vehicle. The location of the connecting rods afford greater protection, gives a greater road clearance, and can be more easily operated and positively controlled, than if otherwise located. The connecting rods of the front axle can be suitably inclosed as further protection from dust and injury.

Such variations in the structural details of my invention, as are permissible by the appended claims, can be resorted to, without departing from the spirit and scope of the invention.

What I claim and desire to secure by Letters Patent, is:—

1. In a vehicle steering gear, a wheel hub embodying a metallic housing closed at the outer end and open at the inner end, dowel pins carried on the inner face of said closed end, a spindle inclosed by said hub and having a head on its inner end having openings to receive said dowel pins, a screw passed through said closed end into said spindle, a swivel-joint support mounted on said spindle, and provided with diametrically-opposed apertured lugs, connecting rods pivotally-attached at their outer ends to said lugs, means connected to the inner ends of said connecting-rods for operating the same, two oppositely-disposed and vertically-alined bearing-pins carried by said swivel-support having bearing-sleeves surrounding the same, and an axle bifurcated to form arms at its outer ends, the said arms being secured to said bearing-sleeves, and said axle supporting the inner ends of the connecting rods and the operating means therefor.

2. In a vehicle steering gear, the combination with an axle bifurcated at its ends to form arms, of wheel hubs each comprising metallic housings having an integrally-closed outer end and open inner end, a spindle having an annular head on its inner end provided with openings, dowel pins carried by the closed end of said housing to engage said openings, and a screw passed through the closed end of the housing whereby the spindle is supported centrally of said housing, a swivel-joint support mounted on said spindle and provided on opposite sides with apertured lugs, oppositely-disposed bearing pins carried by said swivel-support having bearing-sleeves surrounding the same, ball-bearings for said bearing-sleeves, the arms of said axle being connected to said bearing-sleeves, connecting-rods pivotally-attached at their outer ends to said apertured-lugs carried by the swivel-joint, means for connecting and supporting the inner ends of said connecting rods mid-way the length of the axle, and means connected to said connecting rods for actuating the same.

In testimony whereof I affix my signature in the presence of two witnesses.

ALLEN H. DINGMAN.

Witnesses:
MAX H. SROLOVITZ,
J. H. McGRAW.